United States Patent [19]

MacLeay et al.

[11] 3,962,210

[45] June 8, 1976

[54] TERTIARY ALIPHATIC ALPHA-(SULFO)-AZO COMPOUNDS

[75] Inventors: Ronald Edward MacLeay, Williamsville; Chester Stephen Sheppard, Tonawanda, both of N.Y.

[73] Assignee: Pennwalt Corporation, Philadelphia, Pa.

[22] Filed: Mar. 21, 1974

[21] Appl. No.: 453,456

Related U.S. Application Data

[63] Continuation-in-part of Ser. No. 88,250, Nov. 9, 1970, abandoned, which is a continuation-in-part of Ser. No. 725,180, April 29, 1968, abandoned, which is a continuation-in-part of Ser. No. 616,158, Feb. 15, 1967, abandoned.

[52] U.S. Cl. .............................. 260/192; 260/152; 260/154; 260/156; 260/157; 260/158; 260/864; 526/220; 526/271; 526/347
[51] Int. Cl.² ...................................... C07C 107/02
[58] Field of Search .................................. 260/192

[56] References Cited
FOREIGN PATENTS OR APPLICATIONS
929,182  6/1963  United Kingdom................. 260/192
988,253  4/1965  United Kingdom................. 260/192

*Primary Examiner*—Charles F. Warren
*Attorney, Agent, or Firm*—Charles E. Feeny

[57] ABSTRACT

Novel t-aliphatic α-(sulfo) azo compounds:

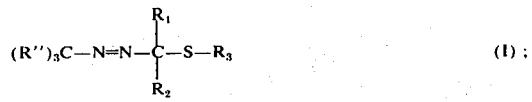

and the use of compounds I as polymerization initiators for vinyl monomers and as curing agents for resins. For example, 2-t-butylazo-2-thiophenoxy-4-methylpentane, prepared by reacting a solution of thiophenol and sodium hydroxide in methanol with 2-t-butylazo-2-chloro-4-methylpentane at 10° – 15°C., is used to cure an unsaturated polyester-styrene resin at 115°C. and to polymerize styrene at 115°C.

10 Claims, No Drawings

TERTIARY ALIPHATIC ALPHA-(SULFO)-AZO COMPOUNDS

CROSS-REFERENCE TO RELATED APPLICATIONS

This application is a continuation-in-part of copending application Ser. No. 88,250 filed Nov. 9, 1970 (now abandoned), which in turn is a continuation-in-part of Ser. No. 725,180 filed Apr. 29, 1968 (now abandoned), which in turn is a continuation-in-part application of application Ser. No. 616,158, filed Feb. 15, 1967 (now abandoned).

BACKGROUND OF THE INVENTION

This invention relates to novel t-aliphatic α-(sulfo) azo compounds (I), and to their use as polymerization initiators for vinyl monomers and as curing agents for polyester resin compositions.

To the best of applicants' knowledge, no α-(sulfo) azo compounds of structure I have been previously reported.

U.S. Pat. No. 3,282,912 and Canadian Pat. No. 750,380 report α-sulfoazo compounds of structures II and III, respectively:

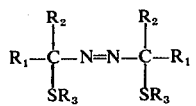    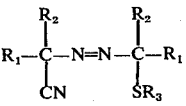

(II)                    (III) .

Compounds II are symmetrical azo compounds and thus are in a completely different category from the subject unsymmetrical t-aliphatic azo compounds (I). For example, symmetrical azo compounds have much lower decomposition temperatures (i.e., are much less stable) than the corresponding unsymmetrical t-aliphatic I compounds derived from the same ketone. When $R_1$ is methyl, $R_2$ is isobutyl and $R_3$ is phenyl, compound II is a solid having a 10 hour half-life at about 82°C., while compound I of this invention is a liquid having a 10 hour half-life at about 118°C. making I more useful for high-temperature applications. While compounds III are unsymmetrical, they include cyano groups (rather than R'' as in compound I) which increase toxicity problems and decrease hydrocarbon solubility. Further, it is not evident from Canadian Pat. No. 750,830 that any compounds of structure III were ever made and no preparatory examples are given. Statements in the patent further indicate that compounds III would be less stable than the instant compounds I.

BRIEF SUMMARY OF THE INVENTION

The subject invention is directed to:

(A) novel t-aliphatic ("t" = tertiary)azo compounds containing an α-sulfo group as represented by the formula:

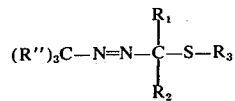    (I) , where:

$(R'')_3C$ is a $C_4$ to $C_{20}$ t-alkyl, cycloalkyl, alkylcycloalkyl or aralkyl (normally hydrocarbon aralkyl) radical where R'' is a $C_1$ to $C_8$ alkyl, $C_7$ to $C_{12}$ aralkyl (preferably phenalkyl) or $C_6$ to $C_{14}$ aryl (normally hydrocarbon aryl) radical, not more than one R'' being aromatic, and where 2 or 3 of said R''s can join with the tertiary carbon atoms to form a $C_3$ to $C_{12}$ cyclo, bicyclo or tricyclo radical (normally cycloalkyl);

$R_1$ and $R_2$ are separately selected from a $C_1$ to $C_{10}$ alkyl, $C_3$ to $C_{12}$ cyclo-, bicyclo- or tricycloalkyl, $C_7$ to $C_{12}$ aralkyl (normally phenalkyl) and 5 to 6 membered heterocyclic radical where the hetero atom is O, S or N (i.e., as in furan, pyran, pyridine, pyrrole, thiophan or thiophen), $R_1$ can also be a $C_6$ to $C_{14}$ aryl (normally hydrocarbon aryl) radical, $R_1$ and $R_2$ taken together can form a $C_3$ to $C_{11}$ alkylene diradical, and one or more of each of $R_1$ and $R_2$ can be substituted with radicals selected from lower (i.e., about 1–4 carbons) alkoxy, hydroxy, carboxy, lower alkoxycarbonyl, lower acyloxy (i.e., lower alkylcarbonyloxy or phenylcarbonyloxy), halogen (preferably chloro, bromo or fluoro), cyano, amido (i.e., aminocarbonyl) and lower alkylsulfonato; and $R_3$ is a radical selected from:
a. $C_1$ to $C_{20}$ alkyl or cycloalkyl which can be substituted with radicals which include hydroxy, amino, carboxy, lower acyloxy, lower acyl (i.e., lower alkylcarbonyl), lower alkoxycarbonyl, aryloxycarbonyl (preferably phenoxycarbonyl), halogen, amido, aryl or substituted aryl (preferably phenyl), lower alkoxy, aryloxy (preferably phenoxy), lower alkylthio, arylthio or substituted arylthio (preferably phenylthio or a lower alkyl substitute thio, cyano and carbonato;
b. $C_6$ to $C_{14}$ aryl (preferably hydrocarbon aryl) which can be substituted as in (a) above as well as with $C_1$ to $C_6$ alkyl groups;
c. 5 or 6 membered heterocyclic or substituted heterocyclic ring containing one or two oxygen, nitrogen or sulfur hetero atoms or combinations thereof; and
d. $-C(=O)R_4$, $-C(=S)OR_4$ or $-C(=S)SR_4$ where $R_4$ is a $C_1$ to $C_{12}$ alkyl or cycloalkyl or $C_6$ to $C_{14}$ aryl (preferably hydrocarbon aryl) or substituted aryl radical;

B. The use of compounds I as polymerization initiators (free radical generators) for the homo-or co-polymerization of ethylenically unsaturated monomers which are responsive at suitable temperatures to free radical generators, especially for initiating styrene polymerizations in the temperature range of about 70° – 150°C., and preferably in the 85° – 130°C. range, depending on the $(R'')_3C$, $R_1$, $R_2$ and $R_3$ radicals; and C. The use of compounds I as curing agents (free radical initiators) for the curing of unsaturated polyester resin compositions in the presence of I, especially for curing unsaturated polyester — vinyl monomer blends at temperatures of about 80° – 145°C., normally 100° – 130°C., again depending on the structure of radicals $(R'')_3C$, $R_1$, $R_2$ and $R_3$.

DETAILED DESCRIPTION OF INVENTION

Preparation of I

The novel I compounds are conveniently prepared by reacting an alcohol solution of an alkali or alkaline earth metal salt of the corresponding thio compound with about an equal molar equivalent of a t-aliphatic α-(chloro)azo compound

normally at about 0° – 40°C., where M is the alkali or alkaline earth metal and $m$ is the valence (1 or 2) of M. Various recovery techniques can be employed such as that shown in the examples to follow.

Preparation of the α-(chloro) azo compounds (V) is described in application Ser. No. 725,180, filed Apr. 29, 1968 (now abandoned).

UTILITY

These new compounds are free radical generators, polymerization initiators for vinyl monomers, curing agents for polyester resins, initiators for free radical initiated chemical reactions, blowing agents for producing foamed polymers and plastics, selective oxidizing agents and generators of reactant free radicals.

It has been observed that these new compounds are initiators for the polymerization or copolymerization of unsaturated monomers such as alkenes, vinyl halides, vinyl esters, vinylidene halides and alkenyl aromatics.

Illustrative polymerizable monomers are ethylene, vinyl chloride, vinylidene chloride, vinyl acetate, vinylpyridine, vinylpyrrolidone, vinylcarbazole, butadiene, isoprene, acrylonitrile, acrylic acid, acrylic acid esters, methacrylic acid, methacrylic acid esters, styrene, chlorostyrene and methylstyrenes.

These compounds are very efficient curing agents of polyester resins in the 80° to 145°C. temperature range.

Unsaturated polyesters which are used as the one component of the polyester resin compositions according to the present invention are, for instance, polyesters as they are obtained by esterifying preferably ethylenically unsaturated di-or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2'-dihydroxy ethyl ether); triethylene glycol (ethylene glycol bis-(2-hydroxy ethyl ether); propanediol-1,2; butanediol-1,3; 2,2-dimethyl propanediol-1,3; butene (2)-diol-1,4, glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, hydrophthalic acid, and others and their anhydrides such as phthalic anhydride. The acids used as well as the alcohols employed may be substituted by others substituents, preferably by halogen. Examples of suitable halogenated acids are, for instance, tetrachloro phthalic acid; 1,4,5,6,7,7-hexachloro bicyclo (2,2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

The novel I compounds evolve one mole of nitrogen gas per azo group in the compound when they are decomposed. In addition, other gases are evolved from the breakdown and/or disproportionation of the radicals formed. Thus the novel I compounds are useful in applications where copious quantities of gases are desired such as in producing foamed polymers.

COMPOUNDS

Many novel compounds (I) of the present invention are taught in the examples to follow. Additional compounds which can be prepared according to this invention include:

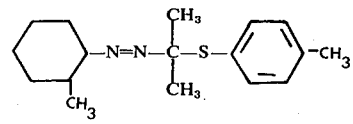

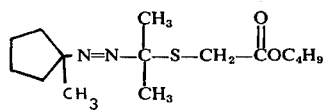

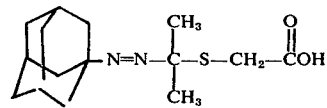

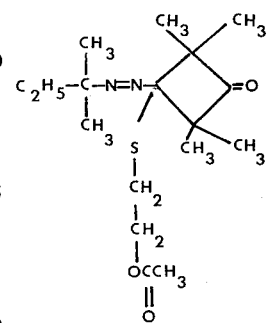

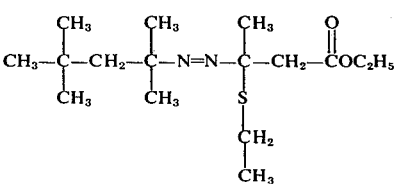

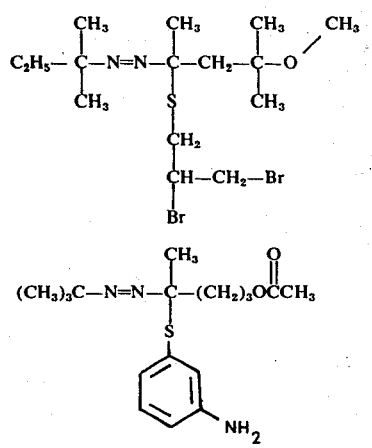
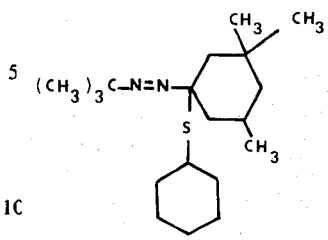
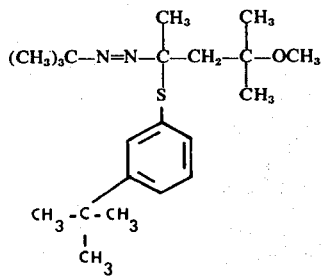
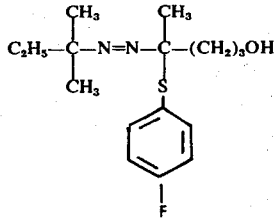
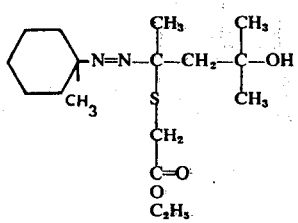
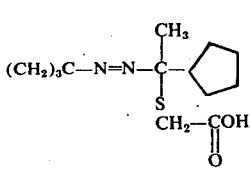

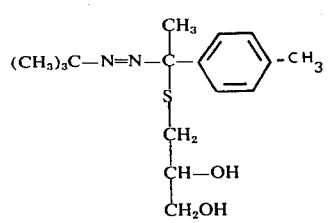
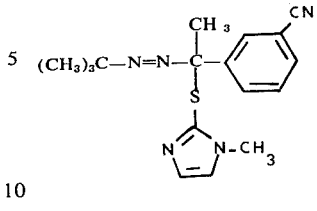
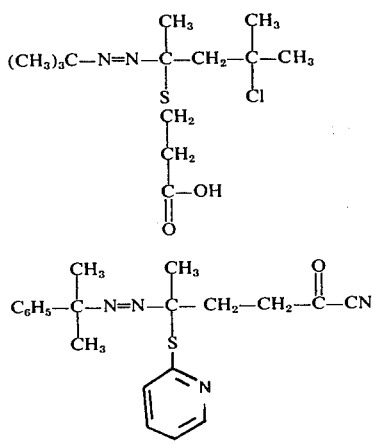
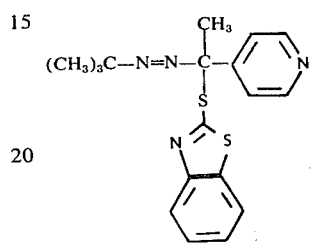
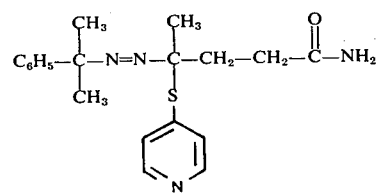
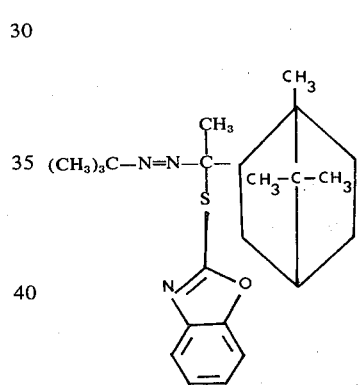
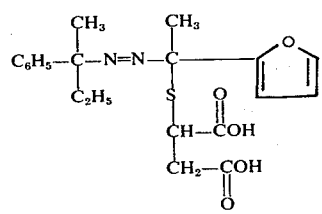
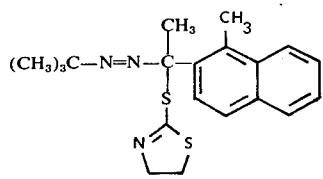
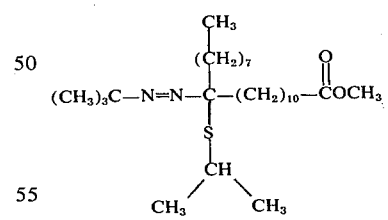
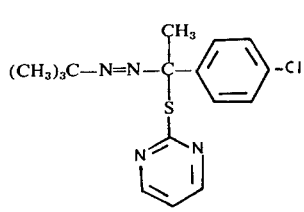
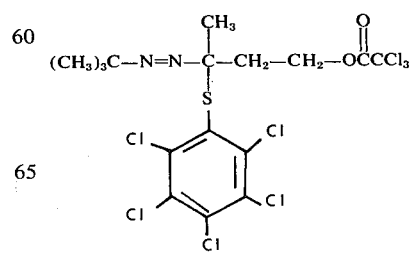

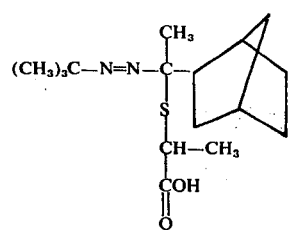
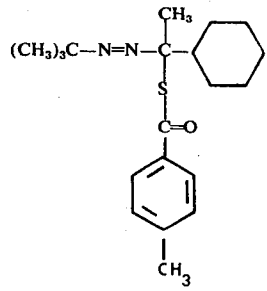
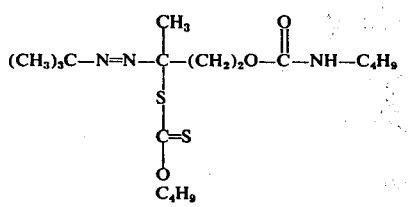
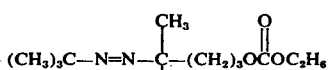
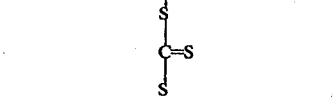
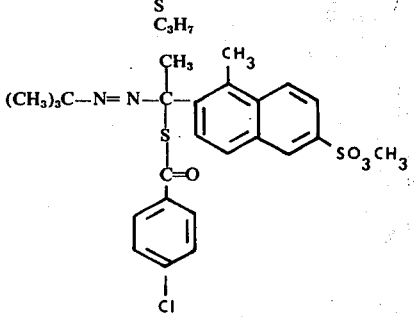
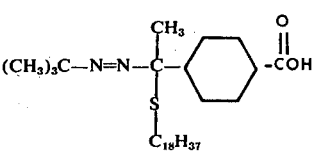
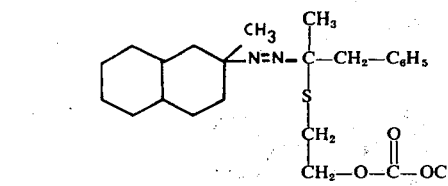
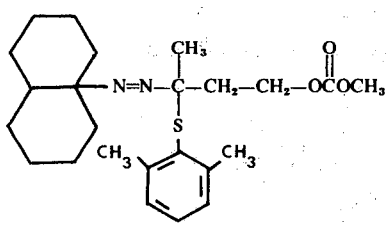
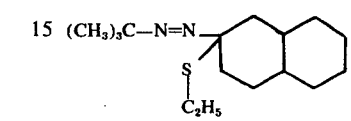
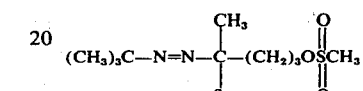
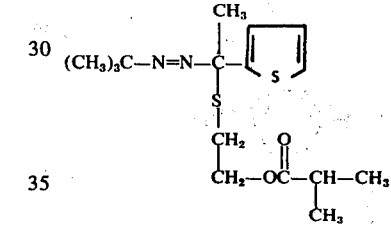
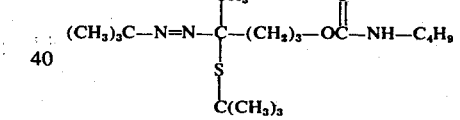
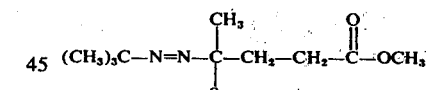
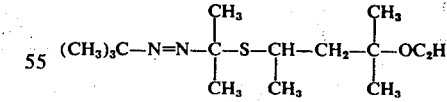
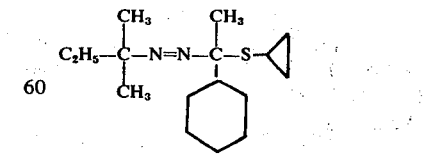
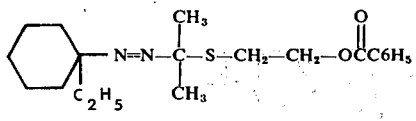

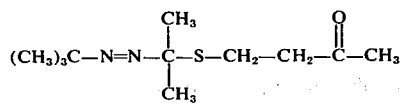
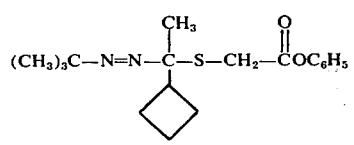
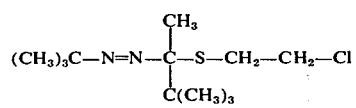
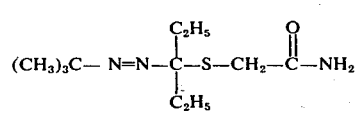
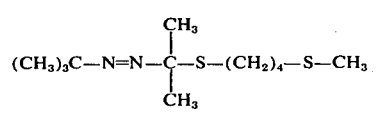
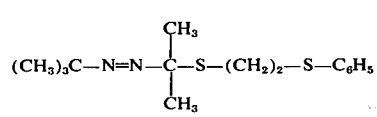
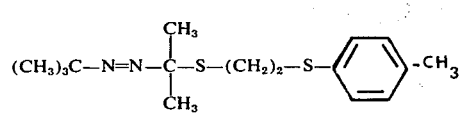
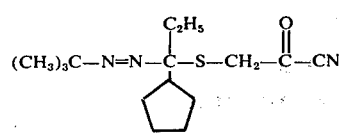
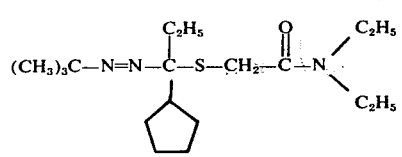
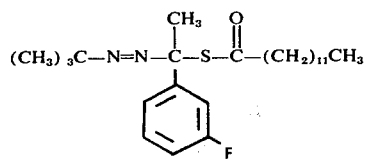
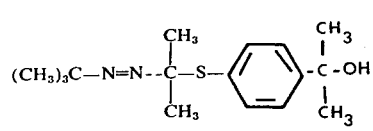
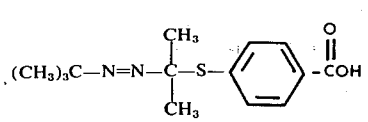
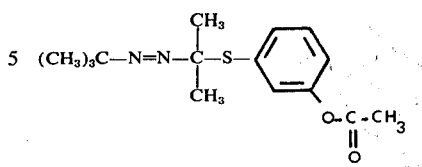
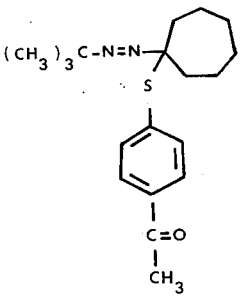
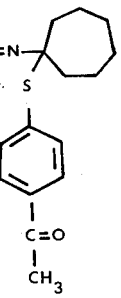
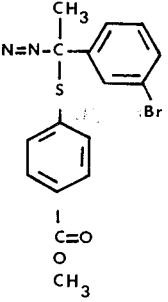
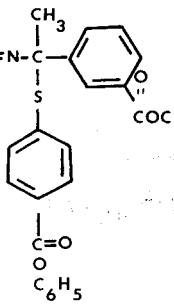
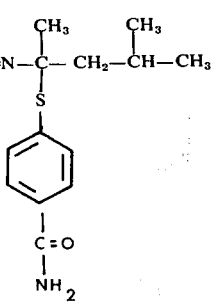
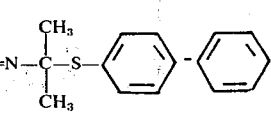

-continued

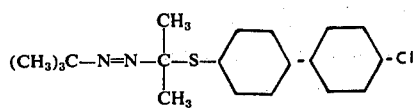
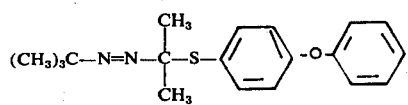
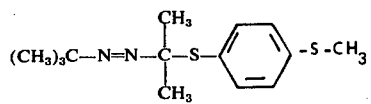
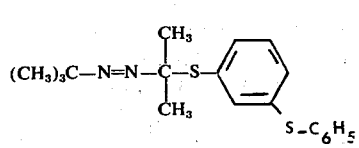
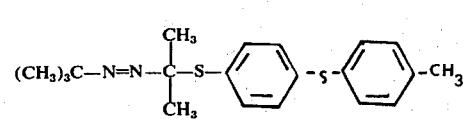
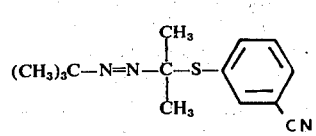
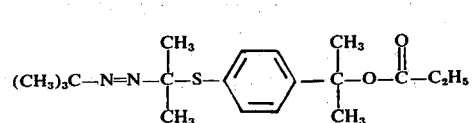
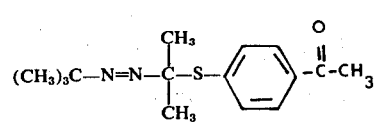
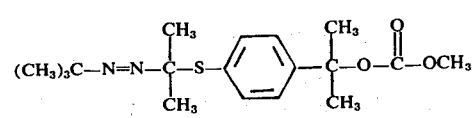
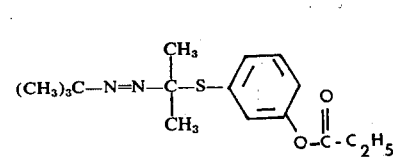
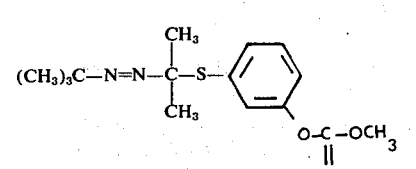
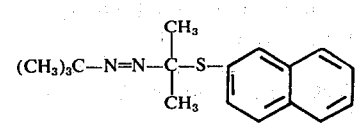

-continued

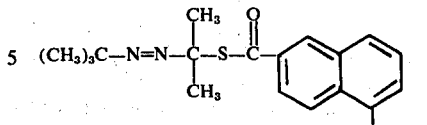
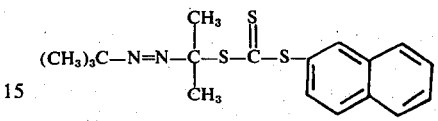
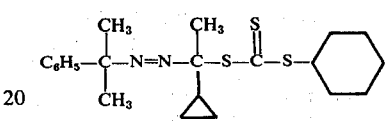

EXAMPLES

The following examples illustrate the invention but are not in limitation thereof.

EXAMPLE I

Preparation of 2-t-Butylazo-2-thiophenoxy-4-methylpentane

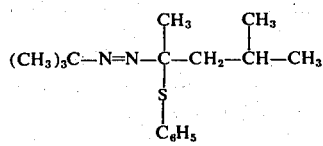

To a solution of 6.0 grams (0.075 moles) of 50% sodium hydroxide and 8.25 grams (0.075 moles) of thiophenol in 70 ml of methanol in a 250 ml 4 neck round bottom flask equipped with a magnetic stirrer, thermometer and dropping funnel, was added 15.4 grams (0.075 moles) of 2-t-butylazo-2-chloro-4-methylpentane over 20 minutes, holding the temperature at 10°–15°C with a cold water bath. Salt formation occurred about one third of the way through the addition. After the addition was complete, the reaction was stirred an additional hour, allowing the temperature to rise to room temperature, 60 ml. of water added and the product extracted with pentane. The pentane layer was separated, washed with 5% NaOH, water, 10% HCl, water, saturated NaHCO$_3$ solution, dried over anhydrous Na$_2$SO$_4$, filtered and the pentane evaporated under reduced pressure to leave 13.2 grams (64% yield) of a yellow liquid. The infrared spectrum of the product was in agreement with the structure of 2-t-butylazo-2-thiophenoxy-4-methylpentane.

2-t-Butylazo-2-thiophenoxy-4-methylpentane was determined to have a 10 hour half-life in trichlorobenzene at 118°C by the standard gas evolution technique.*

* C. G. Overberger, M. T. O'Shaughnessy and H. Shalit, *J. Am. Chem. Soc.* 71 2661(1949).

EXAMPLE II

Curing an Unsaturated Polyester-Styrene Resin with 2-t-Butylazo-2-thiophenoxy-4-methylpentane An unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.013% concentration. Seven parts of this unsaturated polyester was diluted with 3 parts of monomeric styrene to obtain a homogeous blend having a viscosity of 13.08 poise and a specific gravity of 1.14.

To 20 grams of this blend was added 0.2 grams of 2-t-butylazo-2-thiophenoxy-4-methylpentane (from Example I) and the mixture stirred up well with a wooden spatula. The resultant mixture was transferred to a test tube which was placed in a 115°C constant temperature bath. The internal temperature was recorded as a function of time and a peak exotherm of 416°F (213°C) was reached in 7.9 minutes indicating an excellent cure of the unsaturated polyester-styrene resin blend had occurred. The resultant cured material was very hard.

Without an initiator, no cure of this resin blend occurred after more than 30 minutes at 115°C.

EXAMPLE III

Polymerization of Styrene with 2-t-Butylazo-2-thiophenoxy-4-methylpentane

A series of pyrex test tubes was filled with styrene solutions containing varying amounts of 2-t-butylazo-2-thiophenoxy-4-methylpentane. The amounts of azo initiator in the tubes were adjusted so that the resulting conversion versus concentration plots would cross 98.5% conversion, ideally, after 8.5 hours at 115°C. (The 98.5% conversion figure was selected since styrene polymerizations are carried out almost to complete conversion commercially. Hence, initiators that dead-end after 90% conversion and before 98.5% conversion or active 98.5% conversion after using very large quantities of initiator are not attractive commercially.) After flushing out the tubes with nitrogen gas, they were sealed and placed in a constant temperature bath thermostatted at 115°C. After 8.5 hours at 115°C, the tubes were removed and quickly chilled to 0°C to prevent post polymerization. The sealed tubes were then broken and the polymer dissolved in 1000 ml. of methanol to precipitate the polystyrene. The polymer was separated by filtration and dried in an oven at 50°–55°C. The conversion of styrene to polymer then determined and plots of initiator concentration versus conversion were constructed. The initiator concentration required to attain 98.5% conversion (or thereabout) was compared under similar conditions, to that of di-t-butyl peroxide. Equation (1) was used to determine efficiency data.

$$F_1/F_2 = Rp_1^2/Rp_2^2 \times Kd_2/Kd_1 \times [I]_2/[I]_1 \qquad (1)$$

$F_1/F_2$ is the efficiency of the 2-t-butylazo-2-thiophenoxy-4-methylpentane compared to that of di-t-butyl peroxide ($F_2$), $Rp_1$ and $Rp_2$ are rates of polymerization of the azo initiator and di-t-butyl peroxide, respectively and $[I]_1$ and $[I]_2$ are concentrations of azo initiators and di-t-butyl peroxide, respectively, required for attainment of 98.5% conversion after 8.5 hours at 115°C. Under these conditions:

$$Rp_1^2/Rp_2^2 = 1$$

We also know $Kd_2/Kd_1$ from the half-lives of di-t-butyl peroxide and the azo initiator, respectively. Hence, the value of $F_1/F_2$ can be calculated and in the case of 2-t-butylazo-2-thiophenoxy-4-methylpentane $F_1/F_2$ was determined to be 1.10. Therefore, 2-t-butylazo-2-thiophenoxy-4-methylpentane is a very efficient initiator for styrene polymerizations.

EXAMPLE IV

Preparation of 2-t-Butylazo-2-(para-t-butylthiophenoxy)propane

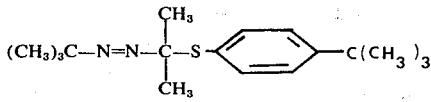

To a solution of 8.17 grams (0.102 moles) of 50% sodium hydroxide and 17.0 grams (0.102 moles) of para-t-butylthiophenol in 70 ml. of methanol in a 250 ml. 4 neck round bottom flask equipped with a magnetic stirrer, thermometer and dropping funnel, was added 13.2 grams (0.0815 moles) of 2-t-butylazo-2-chloropropane over 20 minutes, holding the temperature at 10°–15°C with a cold water bath. Salt formation occurred about one third of the way through the addition. After the addition was complete, the reaction was stirred an additional 30 minutes, allowing the temperature to rise to room temperature, 150 ml. of water added and the product extracted with pentane. The pentane layer was separated, washed with 5% NaOH, water, 10% HCl, water, saturated NaHCO$_3$ solution, dried over anhydrous sodium sulfate, filtered and the pentane evaporated under reduced pressure to leave 15.8 grams (66% yield) of a yellow solid (m.p. 34°–36°C). The infrared spectrum of the product was in agreement with the structure of 2-t-butylazo-2-(para-t-butylthiophenoxy)propane.

It was determined by gas evaluation techniques that 2-t-butylazo-2-(para-t-butylthiophenoxy)propane has a 10 hour half-life at 128°C.

At a 1.0 weight pere cent loading the above azo initiator cured the unsaturated polyester-styrene resin of Example II at 115°C giving a peak exotherm of 372°F (189°C) in 18.9 minutes. At 130°C a peak exotherm of 434°F (223°C) was obtained in 7.2 minutes. The resultant cured materials were very hard.

EXAMPLE V

Preparation of 2-t-Butylazo-2-dodecylthio-4-methoxy-4-methylpentane

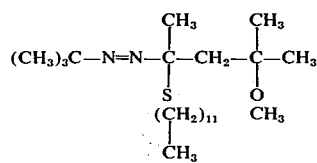

To a solution of 8.8 grams (0.11 moles) of 50% sodium hydroxide and 22.3 grams (0.11 moles) of 1-dodecanethiol in 70 ml. of methanol in a 500 ml. erlenmeyer flask immersed in an ice bath, was added 23.5 grams (0.1 mole) of 2-t-butylazo-2-chloro-4-methoxy-4-methylpentane over 20 minutes, holding the temperature at 5°C. After the addition was complete, the reaction was stirred for 60 minutes at 5°C, poured into 300 ml. of water and the product extracted with 100 ml. of pentane. The pentane layer was separated, washed with 5% NaOH, water, 10% HCl, water, saturated NaHCO₃ solution, dried over anhydrous sodium sulfate, filtered and the pentane evaporated under reduced pressure to leave 36.8 grams (91% yield) of a yellow liquid. The infrared spectrum of the product was in agreement with the structure of 2-t-butylazo-2-dodecylthio-4-methoxy-4-methylpentane.

It was determined by gas evaluation techniques that the product has a 10 hour half-life at 91°C.

At a 1.0 weight per cent loading the above azo initiator cured the unsaturated polyester-styrene resin of Example II at 115°C giving a peak exotherm of 434°F (223°C) in 4.9 minutes and a very hard cured resin.

EXAMPLE VI

Preparation of 1-t-Butylazo-1-octylthiocyclohexane

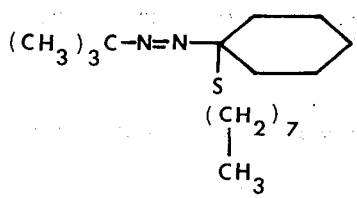

To a solution of 7.25 grams (0.11 moles) of 85% potassium hydroxide and 14.6 grams (0.10 moles) of 1-octanethiol in 100 mls. of methanol in a 250 ml. beaker, was added 22.2 grams (0.11 moles) of 1-t-butylazo-1-chlorocyclohexane over 30 minutes, holding the temperature at 20°-25°C. After the addition was complete, the reaction was stirred for 30 minutes at 20°C, 100 mls. water added and the product extracted with 100 ml. of pentane. The pentane layer was separated, washed with 5% NaOH, water, 20% HCl for ½ hour, water, saturated NaHCO₃ solution, dried over anhydrous sodium sulfate, filtered and the pentane evaporated under reduced pressure to leave 26.0 grams (83.5% yield) of a yellow liquid. The infrared spectrum of the product was in agreement with the structure of 1-t-butylazo-1-octylthiocyclohexane.

EXAMPLE VII

Preparation of 2-t-Butylazo-2-propylthio-4-methylpentane

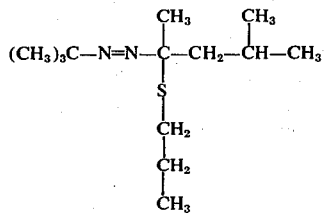

To a solution of 0.04 moles of n-propylmercaptan and 0.05 moles of sodium hydroxide in 30 ml. of 80% aqueous ethanol, was added 0.02 moles of 2-t-butylazo-2-chloro-4-methylpentane over 20 minutes, holding the temperature at 10°C with a cold water bath. After the addition was complete, the reaction was stirred for an additional 30 minutes at room temperature, poured into 200 ml. of water and the product extracted with pentane. The pentane layer was separated, washed with water, dried over anhydrous Na₂SO₄, filtered and the pentane evaporated under reduced pressure to leave 4.65 grams (95% yield) of a yellow liquid. The infrared spectrum of the product was in agreement with the structure of 2-t-butylazo-2-propylthio-4-methylpentane.

EXAMPLE VIII

Preparation of 2-t-Butylazo-2-(β-hydroxyethylthio)propane

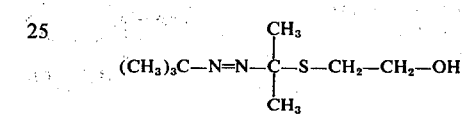

To a solution of 16.5 grams (0.25 moles) of 85% potassium hydroxide and 20 grams (0.255 moles) of 2-mercaptoethanol in 200 mls. of methanol in a 600 ml. beaker, was added 40.5 grams (0.25 moles) of 2-t-butylazo-2-chloropropane over 10 minutes, holding the temperature at 20°-25°C. After the addition was complete, the reaction was stirred for 75 minutes at 25°C, 300 mls. of water added and the product extracted with 100 mls. of pentane. The pentane solution was washed with water, 10% NaOH, water, 5% HCl, saturated NaHCO₃ solution, dried, filtered and the pentane evaporated under reduced pressure to leave 35.6 grams (70% yield) of a yellow liquid. The infrared spectrum of the product was in agreement with the structure of 2-t-butylazo-2-(β-hydroxyethylthio)propane.

At a 1.0 weight per cent loading the above azo initiator cured the unsaturated polyester-styrene resin of Example II at 130°C giving a peak exotherm of 459°F (237°C) in 6.8 minutes and a very hard cured resin.

Examples IX–XXXIII in Table I were prepared by methods similar to those described in Examples I and IV through VIII. Table I gives the name of the compound and its structure, the ketone the starting α-chloro azo compound was derived from, the yield, the temperature at which the compound has a 10 hour half-life and the SPI cure time and temperature it was derived at (See Example II).

TABLE I

| Example | Name | Structure | Starting Ketone | % Yield | 10 hr. $t_{1/2}$ temp. °C | SPI Cure Minutes | SPI Cure Temp. °C |
|---|---|---|---|---|---|---|---|
| IX | 1-t-butylazo-1-phenyl 1-dodecylthioethane | $(CH_3)_3C-N=N-\underset{C_6H_5}{\overset{CH_3}{C}}-S(CH_2)_{11}CH_3$ | acetophenone | 89 | 58° | 2.6 | 100 |

TABLE I-continued

| Example | Name | Structure | Starting Ketone | % Yield | 10 hr. $t_{1/2}$ temp. °C | SPI Cure Minutes | SPI Cure Temp. °C |
|---|---|---|---|---|---|---|---|
| X | 2-t-butylazo-2-dodecylthio-4-methyl-pentane | $(CH_3)_3C-N=N-C(CH_3)(S(CH_2)_{11}CH_3)-CH_2-CH(CH_3)_2$ | methyl isobutyl ketone | 92 | 110° | 8.4 | 115 |
| XI | 2-t-butylazo-2-octylthio-4-methyl-pentane | $(CH_3)_3C-N=N-C(CH_3)(S(CH_2)_7CH_3)-CH_2-CH(CH_3)_2$ | methyl isobutyl ketone | 99 | 115 | 8.0 | 115 |
| XII | 2-t-butylazo-2-dodecylthiopropane | $(CH_3)_3C-N=N-C(CH_3)_2-S(CH_2)_{11}CH_3$ | acetone | 99 | 126 | 10.4 | 130 |
| XIII | 1-t-butylazo-1-dodecyl-thiocyclohexane | $(CH_3)_3C-N=N-C_6H_{10}-S(CH_2)_{11}CH_3$ | cyclohexanone | 99 | 132° | 11.4 | 130 |
| XIV | 2-t-butylazo-2-octyl-thiopropane | $(CH_3)_3C-N=N-C(CH_3)_2-S(CH_2)_7CH_3$ | acetone | 85 | 126° | 7.9 | 130 |
| XV | 1-t-butylazo-1-phenyl-1-thiophenoxyethane | $(CH_3)_3C-N=N-C(CH_3)(C_6H_5)-S-C_6H_5$ | acetophenone | 84 | 57° | 1.8 | 100 |
| XVI | 1-t-butylazo-1-phenyl-1-(para-t-butylthio-phenoxy)ethane | $(CH_3)_3C-N=N-C(CH_3)(C_6H_5)-S-C_6H_4-C(CH_3)_3$ | acetophenone | 86 | 58° | 1.9 | 100 |
| XVII | 2-t-cumylazo-2-thiophenoxy-4-methylpentane | $C_6H_5-C(CH_3)_2-N=N-C(CH_3)(S-C_6H_5)-CH_2-CH(CH_3)_2$ | methyl isobutyl ketone | 86 | 60° | 2.4 | 82 |
| XVIII | 2-t-butylazo-2-thiophenoxy-4-methoxy-4-methyl-pentane | $(CH_3)_3C-N=N-C(CH_3)(SC_6H_5)-CH_2-C(CH_3)(OCH_3)-CH_3$ | pentoxone | 89 | 96° | 6.5 | 115 |
| XIX | 2-t-butylazo-2-(para-t-butylthiophenoxy)-4-methoxy-4-methyl-pentane | $(CH_3)_3C-N=N-C(CH_3)(S-C_6H_4-C(CH_3)_3)-CH_2-C(CH_3)(OCH_3)-CH_3$ | pentoxone | 85 | 103° | 6.4 | 115 |

TABLE I-continued

| Example | Name | Structure | Starting Ketone | % Yield | 10 hr. t₁/₂ temp. °C | SPI Cure Minutes | SPI Cure Temp. °C |
|---|---|---|---|---|---|---|---|
| XX | 2-t-butylazo-2-(para-t-butylthiophenoxy)-4-methylpentane | (CH₃)₃C—N=N—C(CH₃)(S-C₆H₄-C(CH₃)₃)—CH₂—CH(CH₃)—CH₃ | methyl isobutyl ketone | 80% | 114° | 7.8 | 115 |
| XXI | 2-t-butylazo-2-thiophenoxypropane | (CH₃)₃C—N=N—C(CH₃)₂—S—C₆H₅ | acetone | 70% | 131° | 7.1 | 130 |
| XXII | 1-t-butylazo-1-thiophenoxy-2,2,4-trimethylcyclopentane | (CH₃)₃C—N=N— (cyclopentane with CH₃ groups, S-C₆H₅) | 2,2,4-trimethyl-cyclopentanone | 94% | 127° | 7.8 | 115 |
| XXIII | 1-t-butylazo-1-thiophenoxycyclohexane | (CH₃)₃C—N=N—(cyclohexane, S-C₆H₅) | cyclohexanone | 70% | 138° | 6.8 | 130 |
| XXIV | 1-t-butylazo-1-(para-t-butylthiophenoxy)-cyclohexane | (CH₃)₃C—N=N—(cyclohexane, S-C₆H₄-C(CH₃)₃) | cyclohexanone | 70 | 139° | 7.5 | 130 |
| XXV | n-butyl 4-t-butyl-azo-4-thiophenoxy-valerate | (CH₃)₃C—N=N—C(CH₃)(S-C₆H₅)(CH₂)₂COOC₄H₉ | butyl levulinate | 96 | 129° | 9.0 | 115 |
| XXVI | 2-t-butylazo-2-(β-hydroxyethylthio)-4-methoxy-4-methylpentane | (CH₃)₃C—N=N—C(CH₃)(S-CH₂CH₂OH)—CH₂—C(CH₃)(OCH₃)—CH₃ | pentoxone | 40 | 96° | 4.5 | 115 |
| XXVII | 2-t-butylazo-2-(β-hydroxyethylthio)-4-methylpentane | (CH₃)₃C—N=N—C(CH₃)(S-CH₂CH₂OH)—CH₂—CH(CH₃)—CH₃ | methyl isobutyl ketone | 80 | 113° | 7.1 | 115 |
| XXVIII | 4-t-butylazo-4-(para-t-butylthiophenoxy)pentyl acetate | (CH₃)₃C—N=N—C(CH₃)(S-C₆H₄-C(CH₃)₃)—(CH₂)₃—OCOCH₃ | 4-keto-pentyl acetate | 70 | | | |

TABLE I-continued

| Example | Name | Structure | Starting Ketone | % Yield | 10 hr. $t_{1/2}$ temp. °C | SPI Cure Minutes | SPI Cure Temp. °C |
|---|---|---|---|---|---|---|---|
| XXIX | n-butyl 4-t-butylazo-4-dodecyl-thiovalerate | $(CH_3)_3C-N=N-\underset{\underset{\underset{CH_3}{(CH_2)_{11}}}{S}}{\overset{CH_3}{\underset{|}{C}}}(CH_2)_2\overset{O}{\overset{\|}{C}}OC_4H_9$ | butyl levulinate | 91 | 126° | | |
| XXX | ethyl 3-t-butylazo-3-thiophenoxybutyrate | $(CH_3)_3C-N=N-\underset{\underset{C_6H_5}{S}}{\overset{CH_3}{\underset{|}{C}}}-CH_2-\overset{O}{\overset{\|}{C}}OC_2H_5$ | ethyl acetoacetate | 29 | | | |
| XXXI | n-butyl 4-t-butylazo-4-octylthiovalerate | $(CH_3)_3C-N=N-\underset{\underset{\underset{CH_3}{(CH_2)_7}}{S}}{\overset{CH_3}{\underset{|}{C}}}-(CH_2)_2\overset{O}{\overset{\|}{C}}OC_4H_9$ | butyl levulinate | 67 | 126° | | |
| XXXII | 1-t-butylazo-1-(β-hydroxyethylthio)-cyclohexane | 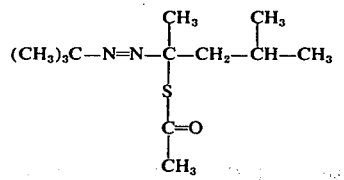 | cyclohexanone | 69 | | 6.5 | 130 |
| XXXIII | 4-t-butylzao-4-(para-t-butylthiophenoxy)-pentanol | $(CH_3)_3C-N=N-\underset{\underset{\underset{\underset{C(CH_3)_3}{\bigcirc}}{}}{S}}{\overset{CH_3}{\underset{|}{C}}}-(CH_2)_3-OH$ | 3-acetylpropanol | 70 | | | |

EXAMPLE XXXIV

Preparation of
2-t-Butylazo-2-thioacetoxy-4-methylpentane $(CH_3)_3C-N=N-\underset{\underset{\underset{CH_3}{C=O}}{S}}{\overset{CH_3}{\underset{|}{C}}}-CH_2-\overset{CH_3}{\underset{|}{CH}}-CH_3$ To a cold solution of 2.64 grams (0.033 moles) of 50% sodium hydroxide and 2.51 grams (0.033 moles) of thioacetic acid in 70 mls. of isopropanol in a 125 ml. erlenmeyer flask, was added 6.5 grams (0.032 moles) of 2-t-butylazo-2-chloro-4-methylpentane dropwise over 15 minutes, holding the temperature around 5°C with an ice bath. After the addition was complete, the reaction was stirred for 90 minutes at room temperature, poured into 300 mls. of water and the product extracted with 50 mls. of pentane. The pentane layer was separated, washed with water, saturated NaHCO₃ solution, dried over anhydrous sodium sulfate, filtered and the pentane evaporated under reduced pressure to leave 5.8 grams (75% yield) of a yellow liquid. The infrared spectrum of the product was in agreement with the structure of 2-t-butylazo-2-thioacetoxy-4-methylpentane.

At a 1.0 weight percent loading the above azo initiator cured the unsaturated polyester-styrene resin of Example II at 130°C giving a peak exotherm of 422°F (216°C) in 7.7 minutes and a very hard cured resin.

EXAMPLE XXXV

Preparation of
2-t-Butylazo-2-benzoylthio-4-methylpentane

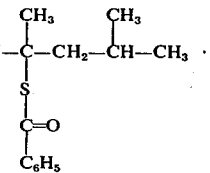

To a cold solution of 2.64 grams (0.033 moles) of 50% sodium hydroxide and 4.57 grams (0.033 moles) of thiobenzoic acid in 70 mls. of isopropanol in a 125 ml. erlenmeyer flask, was added 6.5 grams (0.032 moles) of 2-t-butylazo-2-chloro-4-methylpentane over 15 minutes, holding the temperature around 5°C with an ice bath. After the addition was complete, the reaction was stirred for 90 minutes at room temperature and worked up using the same procedure used in Example XXXV to give 8.1 grams (83% yield) of a yellow liquid. The infrared spectrum of the product was in agreement with the structure of 2-t-butylazo-2-benzoylthio-4-methylpentane.

At a 1.0 weight percent loading the above azo initiator cured the unsaturated polyester-styrene resin of Example II at 130°C giving a peak exotherm of 448°F (231°C) in 8.1 minutes and a very hard cured resin.

EXAMPLE XXXVI

Preparation of Methyl S-(2-t-butylazo)isopropyl Xanthate

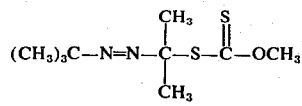

To 22.5 ml. of a 2.25 molar solution of potassium methyl xanthate in methanol in a 50 ml. erlenmeyer flask, was added 8.8 grams (0.05 moles) of 93% 2-t-butylazo-2-chloropropane over 10 minutes, holding the reaction temperature at 25°C ± 3°C with a cold water bath. After the addition was complete, the reaction was stirred at room temperature for 1 hour, poured into 75 ml. of water and extracted with 30 ml. pentane. The pentane solution was washed with 50 ml. water, 25 ml. 5% HCl, 25 ml. of 10% HCl, 25 ml. of saturated NaHCO₃ solution, dried over anhydrous Na₂SO₄, filtered and the pentane evaporated under reduced pressure to leave 10.3 grams (88% yield) of a yellow liquid. The infrared spectrum of the product was in agreement with the structure of methyl S-(2-t-butylazo)isopropyl xanthate.

The compounds of Examples XXXVII – XXXIX in

A. Preparation of an isopropanol solution of potassium phenyl trithiocarbonate

To a solution of 33 grams (0.5 moles) of 85% potassium hydroxide pellets in 220 ml. of isopropyl alcohol was added 55 grams (0.5 moles) of thiophenol, holding the temperature at 30°–35°C. A white solid precipitated out during the addition. After the thiophenol addition was complete, 38 grams (0.5 moles) of carbon disulfide was added. The salt slowly dissolved and an orange-red solution resulted. The solution was stirred an additional 15 minutes and the volume measured. The total volume was 300 mls. The solution was stored in a stoppered erlenmeyer flask for further use.

B. Preparation of phenyl 2-(t-butylazo)isopropyl trithiocarbonate

To 30 mls. of an isopropanol solution, containing 0.05 moles of potassium phenyl trithiocarbonate (from part A) in a 100 ml. beaker was slowly added 8.8 grams (0.05 moles) of 93% 2-t-butylazo-2-chloropropane, holding the reaction temperature at 25°–30°C with a cold water bath. After the addition was complete, the reaction, the reaction was stirred at room temperature for 30 minutes, poured into 100 ml. of water and the product extracted with 50 ml. of pentane. The pentane solution was washed 3 times with 50 ml. portions of water, once with 25 ml. 5% HCl, 10% HCl, saturated NaHCO₃ solution, dried over anhydrous sodium sulfate, filtered and the pentane evaporated under reduced pressure to leave 12.5 grams (80% yield) of an orange liquid. The infrared spectrum of the product was in agreement with the structure of phenyl 2-(t-

TABLE II

| Example | Compound | Structure | Starting α-chloroazo | Yield |
| --- | --- | --- | --- | --- |
| XXXVII | Methyl S-[1-(t-butylazo)-1,3-dimethylbutyl]xanthate | (CH₃)₃C—N=N—C(CH₃)(CH₂CH(CH₃)CH₃)—S—C(=S)—OCH₃ | 2-t-butylazo-2-chloro-4-methylpentane | 80% |
| XXXVIII | Methyl S-[1-(t-butylazo)-cyclohexyl]xanthate | (CH₃)₃C—N=N—[cyclohexyl]—S—C(=S)—OCH₃ | 1-t-butylazo-1-chloro-cyclohexane | 87% |
| XXXIX | Methyl S-[1-(t-butylazo)-1,3-dimethyl-3-methoxybutyl]xanthate | (CH₃)₃C—N=N—C(CH₃)(CH₂C(CH₃)₂OCH₃)—S—C(=S)—OCH₃ | 2-t-butylazo-2-chloro-4-methoxy-4-methyl-pentane | 73% |

Table II were prepared using the same procedure described in Example XXXVI except 0.05 moles of the corresponding α-chloroazo was used instead of 2-t-butylazo-2-chloropropane.

EXAMPLE XL

Preparation of Phenyl 2-(t-Butylazo)isopropyl Trithiocarbonate

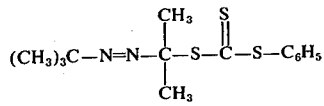

butylazo)-isopropyl trithiocarbonate.

EXAMPLE XLI

Preparation of Phenyl 1-(t-Butylazo)-1,3-dimethyl-3-methoxybutyl Trithiocarbonate

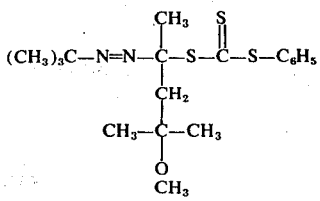

To 30 mls. of an isopropanol solution containing 0.05 moles of potassium phenyl trithiocarbonate (from Example XL part A) in a 100 ml. beaker was slowly added 13.9 grams (0.05 moles) of 84.5% 2-t-butylazo-2-chloro-4-methoxy-4-methylpentane holding the reaction temperature at 25°–30°C with a cold water bath. After the addition was complete, the reaction was stirred at room temperature for 30 minutes, poured into 100 ml. of water and the product extracted with 50 ml. of pentane. The pentane solution was washed 3 times with 50 ml. portions of water, once with 25 ml. of 5% HCl, 10% HCl, saturated $NaHCO_3$ solution, dried over anhydrous sodium sulfate, filtered and the pentane evaporated under reduced pressure to leave 14.8 grams (77% yield) of an orange-red liquid. The infrared spectrum of the product was in agreement with the structure of phenyl 1-(t-butylazo)-1,3-dimethyl-3-methoxybutyl trithiocarbonate.

Example XLII

Preparation of 2-t-Butylazo-2-propylthiopropane

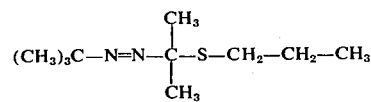

To 200 ml. of a methanol solution containing 18.2 grams (0.275 moles) of 85% potassium hydroxide pellets in a 1½ liter jacketed reactor equipped with a mechanical stirrer, thermometer, condenser connected to a bubbler filled with sodium hypochlorite, was added 20.0 grams (0.263 moles) of 1-propanethiol from a pressure equalizing dropping funnel. After the addition of the mercaptan the reaction mixture was stirred for an additional ½ hour and then 45.5 grams (0.25 moles) of 88.9% 2-t-butylazo-2-chloropropane was added dropwise over 5 minutes controlling the reaction temperature at 22°C ± 3°C by running cold water through the reactor jacket. The reaction was stirred for an additional 1 hour at 25°C, 5 grams (0.0625 moles) of 50% NaOH added along with 400 mls. of water. The product was extracted with 200 mls. of pentane, the pentane layer separated and washed with 50 ml. of 5% NaOH for 5 minutes, 50 mls. of 10% NaOH for 5 minutes, and then 50 ml. portions of water, 5% HCl, 10% HCl, saturated $NaHCO_3$ solution, dried over anhydrous sodium sulfate, filtered, and the pentane evaporated under reduced pressure to leave 45.9 grams (91.4%) of crude 2-t-butylazo-2-propylthiopropane. Gas chromatographic analysis indicated there was small amounts of 2-t-butylazo-2-methoxypropane and propyl disulfide present in the product.

Examples XLIII – XLVIII in Table III were prepared on a 0.25 mole scale using the same method employed in Example XLII, substituting the α-chloroazo compound and 2-propanethiol were appropriate. Table III gives the name of the compound and its structure, the starting α-chloroazo compound, the starting mercaptan and the yield.

TABLE III

| Example | Name | Structure | Starting α-chloroazo | Starting Mercaptan | (%) Yield |
|---|---|---|---|---|---|
| XLIII | 2-t-Butylazo-2-propylthio-4-methoxy-4-methylpentane | $(CH_3)_3C-N=N-\underset{\underset{\underset{CH_3}{CH_2}}{\underset{CH_2}{S}}}{\overset{CH_3}{C}}-CH_2-\underset{CH_3}{\overset{O}{C}}-CH_3$ | 85% 2-t-butylazo-2-chloro-4-methoxy-4-methylpentane | 1-propanethiol | 94 |
| XLIV | 1-t-butylazo-1-propylthiocyclohexane | $(CH_3)_3C-N=N-\text{cyclohexyl}-S-CH_2-CH_2-CH_3$ | 92.5% 1-t-butylazo-1-chlorocyclohexane | 1-propanethiol | 95 |
| XLV | 2-t-butylazo-2-isopropylthiopropane | $(CH_3)_3C-N=N-\underset{CH_3}{\overset{CH_3}{C}}-S-CH\underset{CH_3}{\overset{CH_3}{{}}}$ | 89% 2-t-butylazo-2-chloropropane | 2-propanethiol | 98 |
| XLVI | 2-t-butylazo-2-isopropylthio-4-methylpentane | $(CH_3)_3C-N=N-\underset{\underset{CH_3\ \ CH_3}{CH}}{\overset{CH_3}{\underset{S}{C}}}-CH_2-\overset{CH_3}{CH}-CH_3$ | 85% 2-t-butylazo-2-chloro-4-methylpentane | 2-propanethiol | 96 |
| XLVII | 2-t-butylazo-2-isopropylthio-4-methoxy-4-methylpentane | $(CH_3)_3C-N=N-\underset{\underset{CH_3\ \ CH_3}{CH}}{\overset{CH_3}{\underset{S}{C}}}-CH_2-\underset{CH_3}{\overset{O}{C}}-CH_3$ | 81% 2-t-butylazo-2-chloro-4-methyox-4-methylpentane | 2-propanethiol | 92 |

TABLE III-continued

| Example | Name | Structure | Starting α-chloroazo | Starting Mercaptan | (%) Yield |
|---|---|---|---|---|---|
| XLVIII | 1-t-butylazo-1-isopropylthio-cyclohexane | $(CH_3)_3C-N=N-\text{[cyclohexyl]}-S-CH(CH_3)_2$ | 92.5% 1-t-butylazo-1-chlorocyclohexane | 2-propanethiol | 90 |
| XLVIII a | 1-t-butylazo-1-(sec-butylthio)-cyclohexane | $(CH_3)_3C-N=N-\text{[cyclohexyl]}-S-CH(CH_3)(C_2H_5)$ | 91.5% 1-t-butylazo-1-chlorocyclohexane | sec-butyl-mercaptan | 93.3 |
| XLVIII b | 2-t-butylazo-2-(sec-butylthio)-4-methylpentane | $(CH_3)_3C-N=N-C(CH_3)(S-CH(CH_3)C_2H_5)-CH_2-CH(CH_3)_2$ | 87% 2-t-butylazo-2-chloro-4-methylpentane | " | 98.5 |
| XLVIII c | 2-t-butylazo-2-(sec-butylthio)-propane | $(CH_3)_3C-N=N-C(CH_3)_2-S-CH(CH_3)C_2H_5$ | 91.5% 2-t-butylazo-2-chloropropane | " | 96.0 |
| XLVIII d | 2-t-butylazo-2-(sec-butylthio)-4-methoxy-4-methylpentane | $(CH_3)_3C-N=N-C(CH_3)(S-CH(CH_3)C_2H_5)-CH_2-C(CH_3)_2-OCH_3$ | 89.4% 2-t-butylazo-2-chloro-4-methoxy-4-methylpentane | " | 90.3 |
| XLVIII e | 1-t-butylazo-1-(t-butylthio)-cyclohexane | $(CH_3)_3C-N=N-\text{[cyclohexyl]}-S-C(CH_3)_3$ | 89.6% 1-t-butylazo-1-chlorocyclohexane | tert-butyl mercaptan | 90.7 |
| XLVIII f | 2-t-butylazo-2-(t-butylthio)-4-methylpentane | $(CH_3)_3C-N=N-C(CH_3)(C_4H_9i)-S-C(CH_3)_3$ | 87% 2-t-butylazo-2-chloro-4-methylpentane | tert.-butyl mercaptan | 94.0 |
| XLVIII g | 2-t-butylazo-2-(t-butylthio)-propane | $(CH_3)_3C-N=N-C(CH_3)_2-S-C(CH_3)_3$ | 91.5% 2-t-butylazo-2-chloropropane | " | 96.3 |
| XLVIII h | 2-t-butylazo-2-(t-butylthio)-4-methoxy-4-methylpentane | $(CH_3)_3C-N=N-C(CH_3)(S-C(CH_3)_3)-CH_2-C(CH_3)_2-OCH_3$ | 89.0% 2-t-butylazo-2-chloro-4-methoxy-4-methylpentane | " | 90.3 |

EXAMPLE IL

Preparation of
S-[1-(t-Butylazo)cyclohexyl]thioglycolic Acid

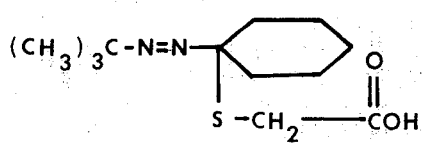

A. Preparation n-Butyl of S-[1-(t-butylazo)cyclohexyl]thioglycolate

To a solution of 8.15 grams (0.055 moles) of butyl thioglycolate in 25 ml. of methanol in a 4 neck round bottom flask cooled to 5°C was slowly added a solution of 3.8 grams (0.055 moles) of 85% potassium hydroxide pellets in 25 ml. of methanol. The mixture was stirred ½ hour at room temperature and then 10.7 grams (0.05 moles) of 95% 1-t-butylazo-1-chlorocyclohexane added dropwise, holding the reaction temperature at 20°C ± 2°C. The reaction mixture was stirred an additional ½ hour, diluted with 100 ml. water and the product extracted with 50 ml. of pentane. The pentane solution was separated, washed with 25 ml. of 10% NaOH, water, 25 ml. of 10% HCl for ½ hour, water saturated NaHCO₃ solution, dried over anhydrous Na₂SO₄, filtered and the pentane evaporated under reduced pressure to leave 11.9 grams (75% yield) of a yellow liquid.

B. Saponification of n-Butyl S-[1-(t-butylazo)cyclohexyl]thioglycolate

The product from above was added slowly to a solution of 3.8 grams (0.0575 moles) of 85% potassium hydroxide pellets in 25 mls. of methanol. The temperature slowly rose from 20°C to 32°C and then dropped back to 26°C. The solution was stirred for 1 hour at room temperature and then 50 ml. of water added. The solution was extracted with 50 ml. of pentane to remove any unsaponified ester and the butyl alcohol. The aqueous layer was then acidified to pH with 20% HCl. The product was extracted with 50 ml. of methylene chloride, the methylene chloride layer washed with water, dried over anhydrous sodium sulfate, filtered and the methylene chloride evaporated to leave 9.85 grams (96½% yield) of a yellow viscous liquid.

EXAMPLE L

Preparation of S-[1-(t-butylazo)-1,3-dimethylbutyl]thioglycolic Acid

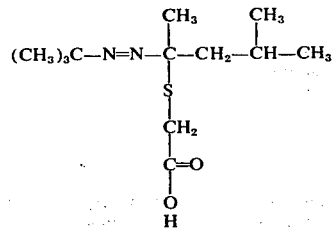

Butyl S-[1-(t-butylazo)-1,3-dimethylbutyl]thioglycolate was prepared in 50 % yield using the procedure described in Example IL part A, substituting 0.05 moles 2-t-butylazo-2-chloro-4-methylpentane for the 1-t-butylazo-1-chlorocyclohexane. The product was then saponified to the free acid using the procedure described in part B of Example IL to give a 83% yield of the acid.

EXAMPLE LI

Preparation of S-[2-(t-butylazo)isopropyl]thioglycolic Acid

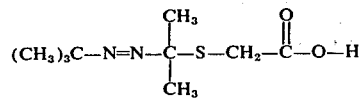

Butyl S-[2-(t-butylazo)isopropyl]thioglycolate was prepared in 80% yield using the procedure described in Example IL part A, substituting 0.05 moles of 2-t-butylazo-2-chloropropane for the 1-t-butylazo-1-chlorocyclohexane. The product was then saponified to the free acid using the procedure described in part B of Example IL to give a 95% yield of the acid.

What is claimed is:

1. A tertiary-aliphatic α-(sulfo)azo compound of the formula

where:

$(R'')_3$ C is $C_4$–$C_{20}$ t-alkyl, cycloalkyl, alkylcycloalkyl or aralkyl where each $R''$ is separately selected from $C_1$–$C_8$ alkyl, $C_7$–$C_{12}$ aralkyl or $C_6$–$C_{14}$ aryl, not more than one $R''$ being aromatic; or 2 or 3 of said $R''$s join with the tertiary carbon atom to form $C_3$–$C_{12}$ cyclo-, bicyclo- or tricycloalkyl;

$R_1$ and $R_2$ separately selected from $C_1$–$C_{10}$ alkyl, $C_3$–$C_{12}$ cyclo-, bicyclo- or tricycloalkyl and, $C_7$–$C_{12}$ aralkyl, $R_1$ can also be $C_6$–$C_{14}$ aryl, $R_1$ and $R_2$ taken together form $C_3$–$C_{11}$ alkylene, or one or more of each of $R_1$ and $R_2$ is substituted with lower alkoxy, hydroxy, carboxy, lower alkoxycarbonyl, lower alkylcarbonyloxy, phenylcarbonyloxy, halogen, cyano, amido or lower alkylsulfonato; and $R_3$ is selected from (a) $C_1$–$C_{20}$ alkyl or cycloalkyl which are unsubstituted or subtituted with radicals selected from hydroxy, amino, carboxy, lower alkylcarbonyloxy, phenylcarbonyloxy, lower alkylcarbonyl, lower alkoxycarbonyl, phenoxycarbonyl, halogen, amido, phenyl, lower alkoxy, phenoxy, lower alkylthio, phenylthio, lower alkylphenylthio, cyano and carbonato; (b) substituted or unsubstituted $C_6$–$C_{14}$ aryl; and (c) —C(=O)R₄, —C(=S)OR₄ or —C(=S)SR₄ where R₄ is $C_1$–$C_{12}$ alkyl or cycloalkyl, or $C_6$–$C_{14}$ aryl or substituted aryl, the substituents in (b), and (c) being selected from the radicals in (a) and $C_1$–$C_6$ alkyl.

2. A compound as in claim 1 where:

$R_1$ and $R_2$ are separately selected from $C_1$–$C_{10}$ alkyl, $C_3$–$C_{12}$ cycloalkyl and $C_7$–$C_{12}$ phenalkyl, $R_1$ can also be $C_6$–$C_{14}$ hydrocarbon aryl, $R_1$ and $R_2$ taken together form $C_3$–$C_{11}$ alkylene, or one or more of each of $R_1$ and $R_2$ is substituted with lower alkoxy, hydroxy, carboxy, lower alkoxycarbonyl, lower alkylcarbonyloxy, phenylcarbonyloxy, halogen, cyano, amido or lower alkylsulfonato; and $R_3$ is selected from (a), (b) or (c).

3. A compound of the formula $(R'')_3C$—N=N—$C(R_1)(R_2)$—$SR_3$ where:

$(R'')_3C$ is t-butyl or α-cumyl;

$R_1$ and $R_2$ are separately selected from $C_1$–$C_{10}$ alkyl, $R_1$ and $R_2$ taken together form $C_3$–$C_{11}$ alkylene, or one or more of each of $R_1$ and $R_2$ is substituted with lower alkoxy, hydroxy, lower alkoxycarbonyl or lower alkylcarbonyloxy; and $R_3$ is selected from (a) $C_1$–$C_{20}$ alkyl or $C_1$–$C_{20}$ alkyl substituted with hydroxy or carboxy; (b) phenyl or t-butylphenyl; and (c) —C(=O)R₄, —C(=S)OR₄ or —C(=S)SR₄ where R₄ is $C_1$–$C_{12}$ alkyl or phenyl.

4. A compound as in claim 3 where $(R'')_3C$ is t-butyl, $R_1$ is methyl and $R_2$ is methyl or isobutyl.

5. A compound as in claim 4 where I is 2-t-butylazo-2-thiophenoxy-4-methylpentane.

6. A compound as in claim 4 where I is 2-t-butylazo-2-(β-hydroxyethylthio)propane.

7. A compound as in claim 4 where I is 2-t-butylazo-2-thioacetoxy-4-methylpentane.

8. A compound as in claim 4 where I is 2-t-butylazo-2-isopropylthio-4-methylpentane.

9. A compound as in claim 4 where I is 2-butylazo-2-(t-butylthio)-4-methylpentane.

10. A compound as in claim 4 where I is S-[2-(t-butylazo)isopropyl]thioglycolic acid.

* * * * *